United States Patent
Makin et al.

(10) Patent No.: US 8,713,376 B1
(45) Date of Patent: Apr. 29, 2014

(54) ESCALATING DATA BACKUP PROTECTION IN RESPONSE TO A FAILURE IN A CLUSTER OF NODES

(75) Inventors: Gaurav Makin, Roseville, MN (US); Nitin Suresh Supekar, Pune (IN)

(73) Assignee: Symantec Corporation, Mountain View, CA (US)

( * ) Notice: Subject to any disclaimer, the term of this patent is extended or adjusted under 35 U.S.C. 154(b) by 281 days.

(21) Appl. No.: 13/337,384

(22) Filed: Dec. 27, 2011

(51) Int. Cl.
- *G06F 11/00* (2006.01)
- *G06F 7/00* (2006.01)
- *G06F 17/00* (2006.01)

(52) U.S. Cl.
USPC .......................................... 714/47.1; 707/654

(58) Field of Classification Search
None
See application file for complete search history.

(56) References Cited

U.S. PATENT DOCUMENTS

| | | | |
|---|---|---|---|
| 6,496,949 B1 * | 12/2002 | Kanevsky et al. | 714/47.1 |
| 7,058,846 B1 | 6/2006 | Kelkar et al. | |
| 7,702,947 B2 | 4/2010 | Peddada | |
| 7,797,565 B1 | 9/2010 | Tran et al. | |
| 7,971,094 B1 | 6/2011 | Benn et al. | |
| 8,055,933 B2 | 11/2011 | Jaehde et al. | |
| 8,209,568 B2 | 6/2012 | Marowsky-Bree et al. | |
| 8,244,998 B1 | 8/2012 | Krinke, II | |
| 8,311,991 B2 | 11/2012 | Aggarwal et al. | |
| 8,312,318 B2 | 11/2012 | Graham et al. | |
| 8,583,601 B1 * | 11/2013 | Claudatos et al. | 707/654 |
| 2004/0153604 A1 * | 8/2004 | Nagasawa et al. | 711/113 |
| 2006/0168473 A1 * | 7/2006 | Sahoo et al. | 714/15 |
| 2007/0168715 A1 * | 7/2007 | Herz et al. | 714/13 |
| 2007/0220298 A1 * | 9/2007 | Gross et al. | 714/2 |
| 2010/0011254 A1 * | 1/2010 | Votta et al. | 714/47 |

\* cited by examiner

*Primary Examiner* — Gabriel Chu
(74) *Attorney, Agent, or Firm* — Meyertons Hood Kivlin Kowert & Goetzel, PC (57) ABSTRACT

A system and method for escalating a level of backup protection for a cluster of nodes are described. A backup software application may be configured to backup application data used by the cluster of nodes according to a first level of backup protection. In response to detecting a failure of a node in the cluster, the backup software application may be reconfigured to backup the application data used by the cluster of nodes according to an escalated level of backup protection. For example, reconfiguring the backup software application to backup the application data according to the escalated level of backup protection may cause the backup software application to increase a frequency at which backup operations for backing up the application data are performed.

20 Claims, 7 Drawing Sheets

ESCALATING DATA BACKUP PROTECTION IN RESPONSE TO A FAILURE IN A CLUSTER OF NODES

BACKGROUND OF THE INVENTION

1. Field of the Invention

This invention relates to the field of backup software for backing up computer system data, and more particularly, to a system and method for escalating a level of backup protection for a cluster of computer system nodes in response to detecting a failure of a node in the cluster.

2. Description of the Related Art

Clustering technology enables multiple independent nodes (computer systems) to be connected together through software to increase the availability of an application. For example, in a two-node cluster, one of the nodes may be designated as the active primary node that runs the application under normal circumstances, and the other node may be designated as a standby secondary node that is ready to take the place of the primary node if necessary, e.g., due to a disaster or failure of the primary node. In the event that the primary node fails or one or more of the application resources on the primary node fail and cannot be re-started, the clustering software may detect the failure and activate the standby secondary node to take over running the application. This is called a failover.

Each node in the cluster may have its own respective instances or copies of the resources required by the application. For example, if the application uses a database then both the primary node and the secondary node may host their own respective replicas of the database. Changes that occur to the database on the primary active node may be replicated to the database on the standby secondary node to keep the replicas synchronized. Thus, in the event of a failover, the application data on the secondary node is already up to date so that the secondary node can quickly begin running the application.

SUMMARY

Various embodiments of a system and method for escalating a level of backup protection for a cluster of nodes in response to detecting a failure of a node in the cluster are described. According to one embodiment, a computer-accessible storage medium may store program instructions executable by one or more processors to configure a backup software application to backup application data used by the cluster of nodes according to a first level of backup protection. The program instructions may be further executable by one or more processors to detect a failure of a node in the cluster, and in response to the failure may configure the backup software application to backup the application data used by the cluster of nodes according to an escalated level of backup protection.

In configuring the backup software application to backup the application data according to the escalated level of backup protection, the program instructions may be executable by the one or more processors to cause the backup software application to increase a frequency at which backup operations for backing up the application data are performed.

In some embodiments, the program instructions may be executable to configure the backup software application to backup the application data according to the first level of backup protection by configuring the backup software application with a first backup policy specifying a first time schedule for backing up the application data. The program instructions may be executable to configure the backup software application to backup the application data according to the escalated level of backup protection by configuring the backup software application with a second backup policy specifying a second time schedule for backing up the application data. The second time schedule may specify an increased frequency for backing up the application data relative to the first time schedule.

In some embodiments, in configuring the backup software application to backup the application data according to the first level of backup protection, the program instructions may be executable by the one or more processors to configure a first snapshot retention period for retaining snapshots used in backing up the application data. In configuring the backup software application to backup the application data according to the escalated level of backup protection, the program instructions may be executable by the one or more processors to increase the snapshot retention period.

In some embodiments, in configuring the backup software application to backup the application data according to the first level of backup protection, the program instructions may be executable by the one or more processors to configure the backup software application to backup the application data to a first storage device. In configuring the backup software application to backup the application data according to the escalated level of backup protection, the program instructions may be executable by the one or more processors to configure the backup software application to backup the application data to a second storage device different than the first storage device. For example, the second storage device may have faster performance than the first storage device, or may be physically located closer to the cluster of nodes than the first storage device.

In some embodiments the program instructions may be further executable by the one or more processors to receive user input specifying a first backup policy that defines the first level of backup protection, and to receive user input specifying a second backup policy that defines the escalated level of backup protection.

In some embodiments the program instructions may be executable by the one or more processors to further escalate the level of backup protection in response to additional node failures. For example, in response to an additional failure of a second node in the cluster, the program instructions may be executable by the one or more processors to configure the backup software application to backup the application data used by the cluster of nodes according to a second escalated level of backup protection.

Further embodiments may comprise a system including one or more processors and memory storing program instructions. The program instructions may be executable by the one or more processors to configure a backup software application to backup application data used by a cluster of nodes according to a first level of backup protection, to detect a failure of a node in the cluster, and in response to the failure, to configure the backup software application to backup the application data used by the cluster of nodes according to an escalated level of backup protection.

Further embodiments may comprise a method in which program instructions are executed on a computer system. Executing the program instructions may include configuring a backup software application to backup application data used by a cluster of nodes according to a first level of backup protection, detecting a failure of a node in the cluster, and in response to the failure, configuring the backup software application to backup the application data used by the cluster of nodes according to an escalated level of backup protection.

BRIEF DESCRIPTION OF THE DRAWINGS

A better understanding can be obtained when the following detailed description is considered in conjunction with the following drawings, in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for escalating a level of backup protection for a cluster of nodes in response to detecting a failure of a node in the cluster are described. As used herein, the term "node" refers to a computer system. The term "cluster" refers to a system including a group of two or more nodes that operate in coordination with each other to increase the availability of an application, e.g., where the cluster includes one or more standby nodes that can be activated in response to a failure of another node.

Figure 1:
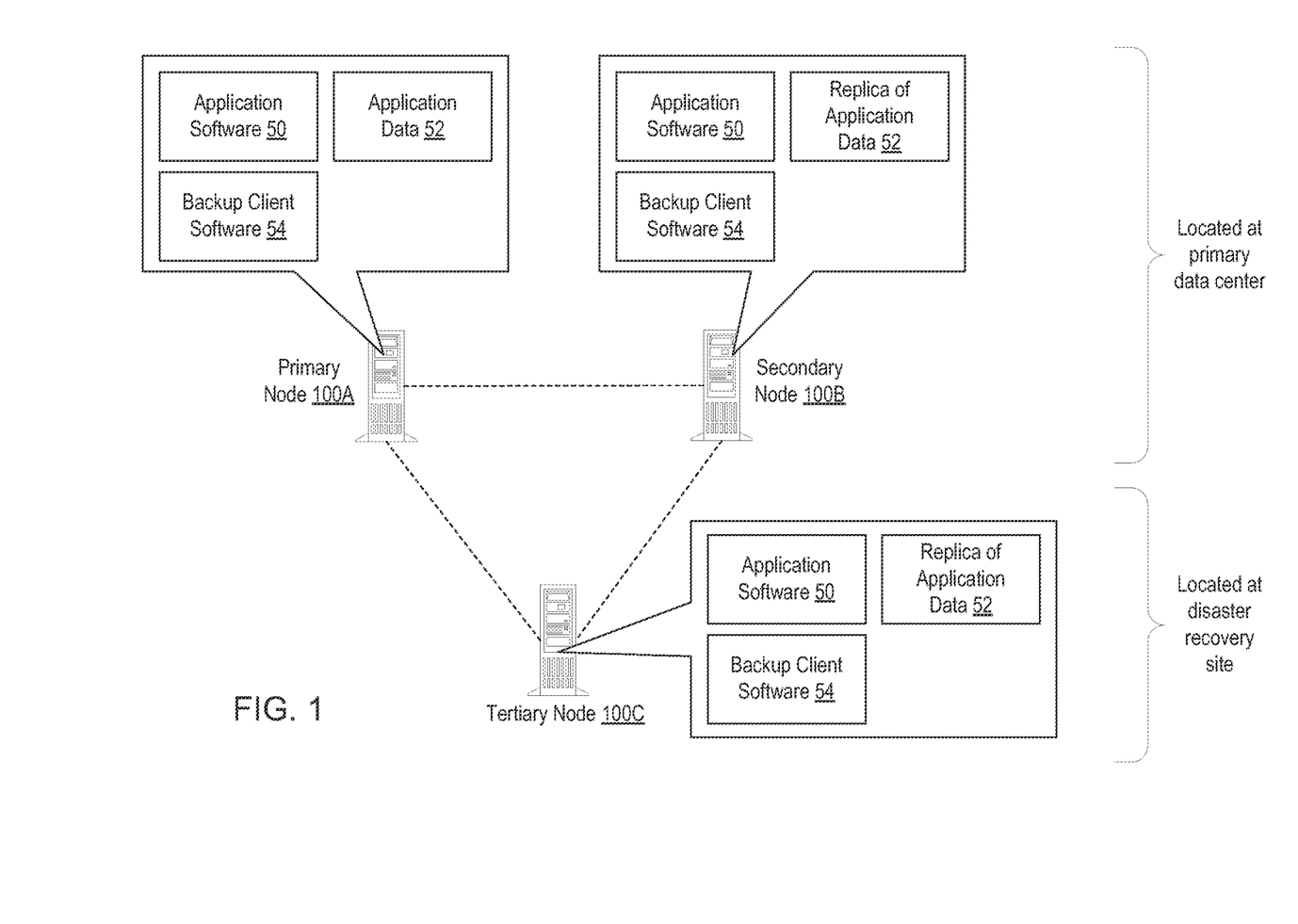
FIG. 1 illustrates one embodiment of a cluster of nodes.

FIG. 1 illustrates one embodiment of a cluster of three nodes. The nodes in the cluster may execute application software 50 to perform any of various kinds of applications that use application data 52. In the example of FIG. 1, the node 100A is the primary node. During normal operation of the cluster, the primary node 100A may be responsible for executing the application. For example, the primary node 100A may act as a server that receives requests from client computers, performs transactions in response to the requests, and updates the application data 52 to reflect the transactions. The nodes 100B and 100C may be standby nodes which normally do not service client requests, but which can be activated if needed. For example, if the primary node 100A fails then the secondary node 100B may be activated to take its place. If both the primary node 100A and the secondary node 100B fail then the tertiary node 100C may be activated.

When a standby node is activated, it needs to have a current copy of the application data 52. Thus, the cluster may be configured to replicate the application data 52 from the primary node 100A to the standby nodes 100B and 100C. For example, as changes occur to the application data 52 on the primary node 100A, the changes may be replicated to the standby nodes 100B and 100C so that each of the nodes has a current replica of the application data 52.

In the example of FIG. 1, the primary node 100A and the secondary node 100B are located at a primary data center, and the tertiary node 100C is located at a disaster recovery site. Having different nodes in the cluster located at different geographical sites may help to increase the availability of the application. For example, if a disaster occurs at the primary data center and causes both the primary node 100A and the secondary node 100B to fail, the tertiary node 100C at the disaster recovery site may be unaffected so that it can still take over the application.

FIG. 1 is given as one example of a cluster, and different clusters may have different configurations. In general, the cluster may include any number of two or more nodes that are coupled to each other through one or more networks. The nodes may be physically located at any number of data centers or sites, e.g., all at the same site, or each one at a different site, or divided in other ways among multiple sites. Also, some clusters may have more than one active node at a time.

The use of standby nodes and data replication as described above may provide some protection for the application data 52. For example, if the primary node 100A fails or the application data 52 on the primary node 100A becomes corrupted, the secondary node 100B can take over the application using its replica of the application data 52.

However, the redundancy of the application data 52 will now be decreased, since with the primary node 100A out of service there is one less copy of the application data. If the secondary node 100B then fails, the tertiary node 100C can take over the application using its replica of the application data 52, but now there is only a single copy of the application data 52, and a failure of the tertiary node 100C could cause the application data 52 to become lost entirely.

Figure 2:
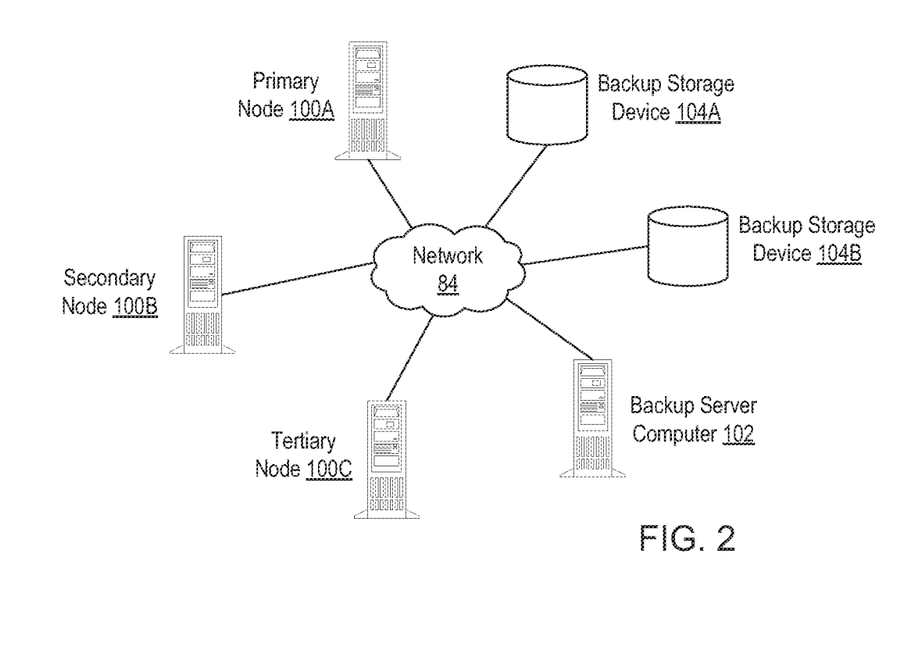
FIG. 2 illustrates an example of a backup server computer and backup storage devices coupled to the nodes.

To handle this problem, the cluster may be configured to perform periodic backup operations to backup the application data 52 from the nodes of the cluster onto one or more separate backup storage devices. As shown in FIG. 1, the nodes may be configured to execute backup client software 54. The backup client software 54 may communicate with backup server software executing on a backup server computer to backup the application data 52 from the nodes to the backup storage device(s). FIG. 2 illustrates an example of a backup server computer 102 and backup storage devices 104A and 104B coupled to the nodes 100. The backup storage devices may be any kind of storage devices suitable for storing backup data, such as disk drives, tape drives, optical drives, solid state drives, etc. In various embodiments the system may include any number of backup storage devices, and the backup storage devices may be located anywhere relative to the nodes 100. For example, one or more of the backup storage devices may be located at the same site as one or more of the nodes 100 (e.g., at the primary data center or disaster recovery site). One or more of the backup storage devices may also be located at another site where none of the nodes 100 are located.

Similarly, the backup server computer 102 may be located at the same site as one or more of the nodes 100, or may be located at another site where none of the nodes 100 are located. The backup server computer 102 may execute backup server software configured to periodically initiate backup operations to backup the application data 52 from one or more of the nodes 100 to one or more of the backup storage devices 104. The backup server software may communicate with the backup client software on the nodes 100 to perform the backup operations. In other embodiments the system may not use a separate backup server computer 102, and the backup client software on the nodes 100 may communicate directly with the backup storage devices 104 to backup the application data 52.

The nodes 100 may be coupled to each other and to the backup server computer 102 and backup storage devices 104 by a network 84. The network 84 may include any type of network or combination of networks. For example, the network may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. The devices may each be coupled to the network(s) using any type of wired or wireless connection medium. For example, wired mediums may include Ethernet, fiber channel, a modem connected to plain old telephone service (POTS), etc.

Wireless connection mediums may include a wireless connection using a wireless communication protocol such as IEEE 802.11 (wireless Ethernet), a modem link through a cellular service, a satellite link, etc.

When the cluster is operating normally, the backup server computer may perform backup operations according to a particular schedule. For example, the schedule may specify that a new backup operation should be performed once every 24 hours or once every 12 hours, etc.

Node failures result in decreased redundancy of the application data 52 and thus make it more likely that the backup data created by the most recent backup operation will actually be needed. When a node failure occurs, one of the nodes exits from the cluster, thereby reducing the number of nodes that have replicas of the application data. It is possible that multiple failures could cause all of the nodes in the cluster to fail. In this case, a new node may need to be added to the cluster, and the application data 52 may need to be restored to the new node from the backup data created by the most recent backup operation.

A node failure thus makes it more likely that the application data 52 will need to be restored from the most recent backup data, since it is possible that additional failures can continue to occur until all of the nodes in the cluster have failed. However, the most recent backup data may be unacceptably old. For example, if the normal backup schedule specifies that backup operations should be performed once every 24 hours then the most recent backup data may be up to 24 hours old, and all the application data changes that occurred since the last backup operation was performed may be lost.

In recognition of this problem, the present system and method may enable multiple levels of backup protection to be defined, and the cluster may be configured to escalate the level of backup protection in response to a node failure. For example, when all the nodes of the cluster are operating normally, the cluster may be configured to perform backup operations according to a normal level of backup protection where a new backup operation is performed once every 24 hours (or according to any other desired schedule). If the primary node fails then the cluster may escalate the level of backup protection. For example, the backup frequency may be increased to once every 6 hours (or any other desired frequency) instead of once every 24 hours. If the secondary node fails then the level of backup protection may be escalated even further, e.g., by increasing the backup frequency from once every 6 hours to once every 2 hours (or any other desired frequency). Thus, the level of backup protection may be escalated in proportion to the seriousness of the problem that the cluster is experiencing, e.g., in proportion to the number of failed nodes. Escalating the backup frequency may ensure that the most recent backup data is fresher than it otherwise may be if the backup operations were being performed at the normal backup frequency.

Figure 3:
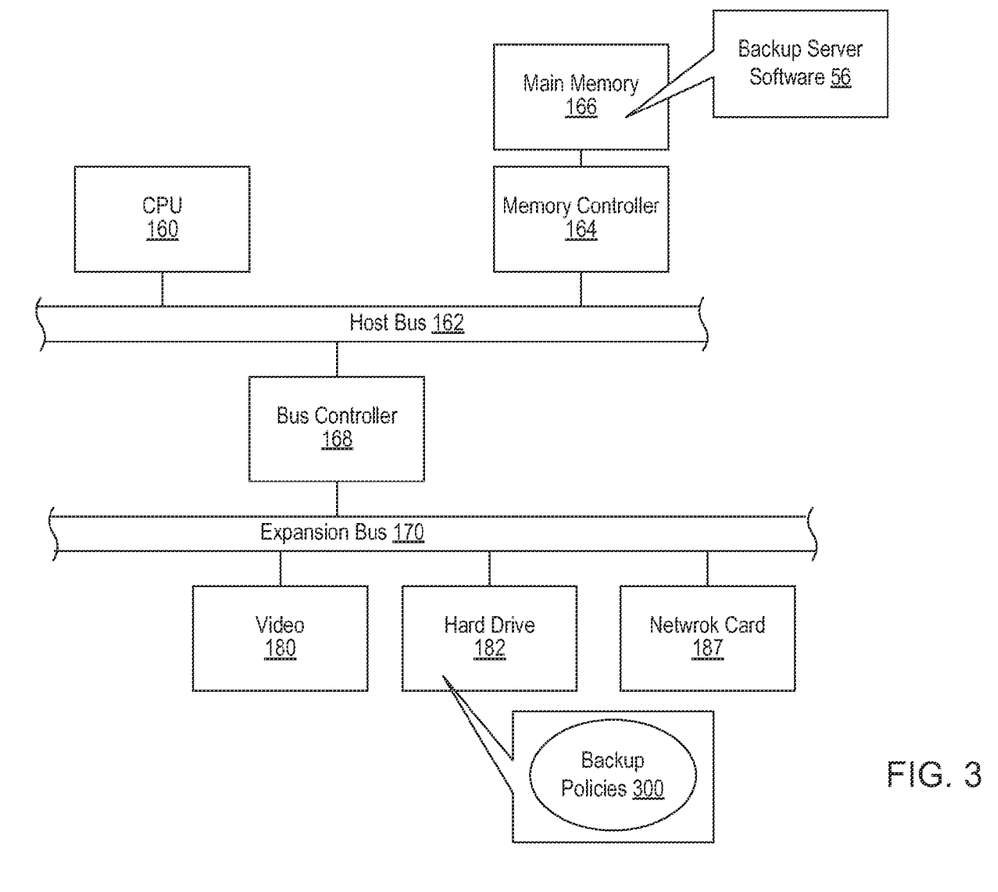
FIG. 3 is a detailed illustration of the backup server computer according to one embodiment.

Referring now to FIG. 3, an example of a backup server computer 102 according to one embodiment is illustrated. In general the backup server computer 102 may be any kind of computer system, such as a personal computer system (PC), workstation, network appliance, distributed computer system, or other computing device or combinations of devices. In general, the term "computer system" is broadly defined to encompass any device (or combination of devices) having at least one processor that executes instructions from one or more storage mediums. The backup server computer system 102 may have any configuration or architecture, and FIG. 3 illustrates a representative PC embodiment. Elements of a computer not necessary to understand the present description have been omitted for simplicity.

The backup server computer system 102 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the backup server computer system 102 may include multiple processors 160.

The backup server computer system 102 may also include memory 166 in which program instructions implementing the backup server software 56 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the backup server computer system 102. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, as well as one or more hard disk drives 182 or other storage device which stores information in a non-volatile manner. The backup server computer system 102 may also include a network card or device 187 that enables the backup server computer system 102 to send and receive information over a network.

The backup server software 56 may be executable by the processor(s) 160 to receive user input (e.g., from an administrator of the cluster) defining multiple levels of backup protection for the cluster. In some embodiments the user input may specify a plurality of backup policies, where each backup policy defines a particular level of backup protection. The backup policies may be stored on the hard drive 182 in one or more files or databases. The backup server software 56 may be further executable by the processor(s) 160 to select different levels of backup protection for the cluster in response to failures detected in the cluster. The backup server software 56 may be further executable by the processor(s) 160 to perform backup operations according to the current level of backup protection.

Figure 4:
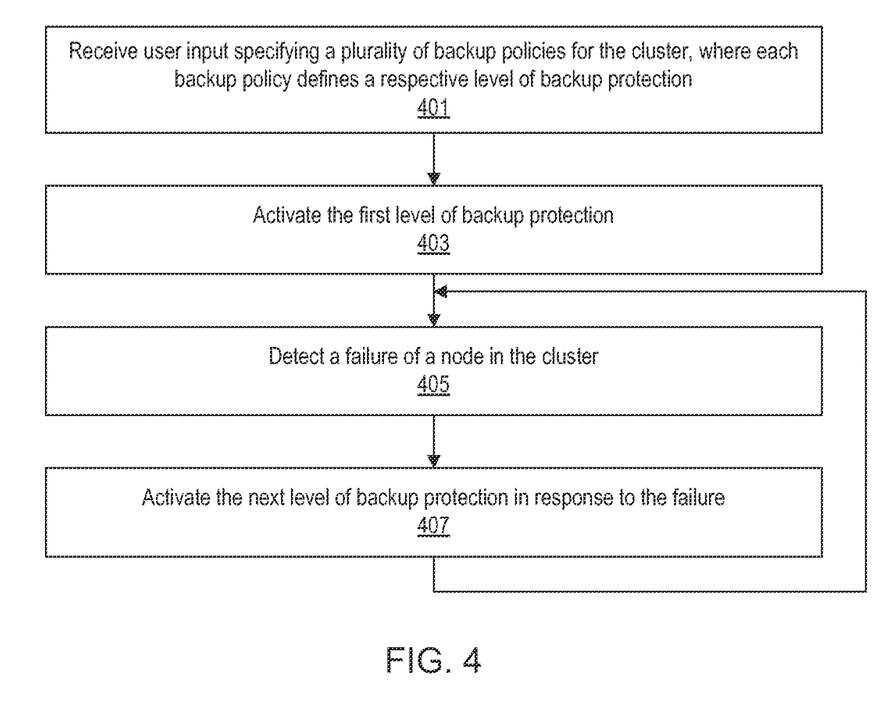
FIG. 4 is a flowchart diagram illustrating one embodiment of a method for escalating the level of backup protection for a cluster in response to detecting failures of nodes in the cluster.

FIG. 4 is a flowchart diagram illustrating one embodiment of a method for escalating the level of backup protection for a cluster in response to detecting failures of nodes in the cluster. The method may be implemented by the backup server software 56 executing on the backup server computer 102.

As indicated in block 401, the backup server software 56 may receive user input specifying a plurality of backup policies for the cluster. For example, the backup policies may be specified by an administrator of the cluster. Each backup policy may define a respective level of backup protection for the cluster, such as how frequently backup operations should be performed, and possibly other information such as described below. One of the backup policies may be a "normal" backup policy that specifies how to perform backup operations when all the nodes in the cluster are operating normally. This may also be referred to as the first backup policy which defines a first level of backup protection. A second backup policy may define a second level of backup protection which is escalated from the first level and which may be activated in response to a failure of one node in the cluster. Similarly, a third backup policy may define a third level of backup protection which is escalated from the second level and which may be activated in response to a failure of two nodes in the cluster, and so on. In various embodiments any number of levels of backup protection may be defined.

As indicated in block 403, the backup server software 56 may then activate the first level of backup protection defined by the first backup policy, e.g., when all the nodes in the cluster are operating normally. The backup server software 56 may perform backup operations for the cluster according to the normal schedule and other information defined by the first backup policy.

As indicated in block 405, the backup server software 56 may subsequently detect a failure of a node in the cluster. In various embodiments the backup server software 56 may detect the node failure in various ways. In some embodiments the cluster may use clustering software that enables the administrator to define a resource group that includes resources to activate in response to a failover event. The resource group may include a backup protection resource, and the backup protection resource may be configured to be activated after all the other resources in the group have come online. This may enable the application to recover from a crash-consistent state before the backup protection resource is activated. Once the backup protection resource is activated, it may communicate with the backup server software 56 to notify the backup server software 56 of the node failure. An example of a resource group including a backup application resource is described below with reference to FIG. 6. In other embodiments the backup server software 56 may register for events in the cluster environment, and may detect a node failure by receiving an event indicating the failure.

As indicated in block 407, the backup server software 56 may then activate the next level of backup protection in response to the failure, e.g., in order to escalate the level of backup protection. Thus, if the first level of backup protection is currently active then the second level of backup protection defined by the second backup policy may be activated. The second level of backup protection may specify a more frequent backup schedule so that the application data 52 is backed up more frequently compared to the normal backup schedule specified by the first backup policy. Thus, in the event that it is necessary to use the most recent set of backup data to recover the application data 52, the backup data may not be as old as it could otherwise potentially be under the normal first policy.

As indicated by the arrow returning from block 407 to block 405, if additional node failures are detected then the active level of backup protection may be escalated further, e.g., from the second level to the third level in response to a second node failure, and then from the third level to the fourth level in response to a third node failure, and so on, depending on how many node failures occur and how many levels of backup protection have been defined.

In some embodiments the backup server software 56 may be executable to display a graphical user interface that enables the administrator to specify the backup policies, and to define the criteria that causes each backup policy to be activated. In general, the term "backup policy" may refer to any set of information that specifies a schedule for performing backups and/or other information affecting how backup operations for backing up the application data 52 are performed.

Figure 5:
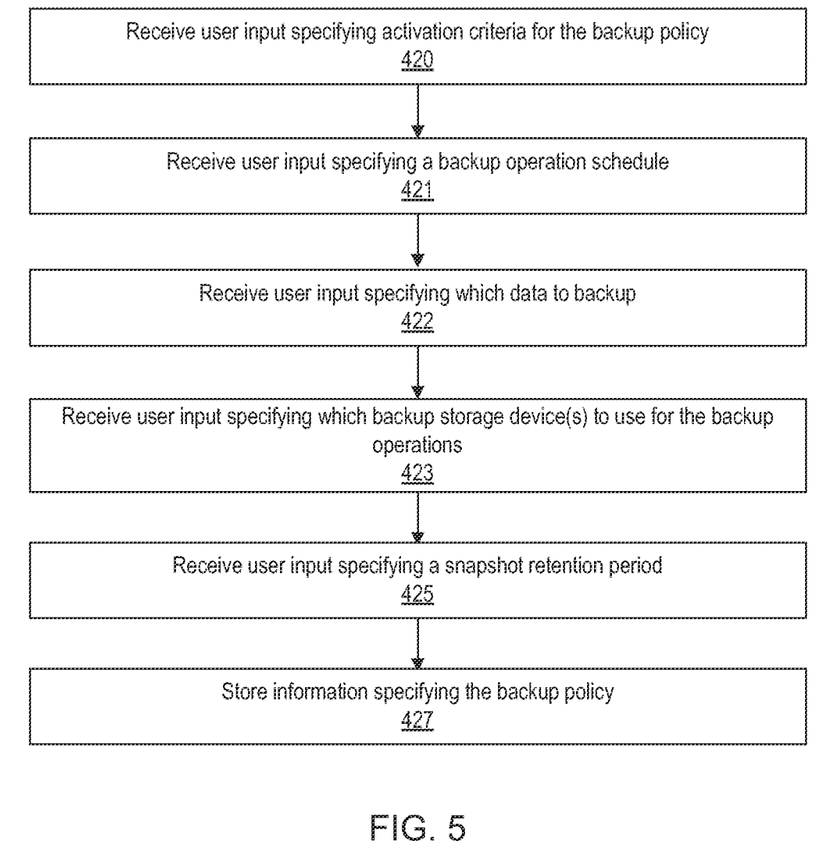
FIG. 5 is a flowchart diagram illustrating one embodiment of a method for specifying a backup policy in response to user input.

FIG. 5 is a flowchart diagram illustrating one embodiment of a method for specifying a backup policy in response to user input. The method may be implemented by the backup server software 56 executing on the backup server computer 102.

As indicated in block 420, the backup server software 56 may receive user input specifying the activation criteria for the backup policy that he is currently defining. For example, the backup server software 56 may enable the user to select an option on the graphical user interface to indicate that the backup policy currently being defined should be the default or normal backup policy. Or if the backup policy currently being defined is not the normal backup policy then the user may specify how many node failures are required to cause the backup policy to become activated. In some embodiments the user may also specify particular nodes that must fail to cause the backup policy to become activated. In other embodiments the backup server software 56 may enable the user to specify any of various other kinds of activation criteria for the backup policy, such as how closely in time the node failures must occur to cause the backup policy to become activated, the amount of load currently being experienced by the nodes in the cluster, etc.

As indicated in block 421, the backup server software 56 may also receive user input specifying a backup operation schedule for the backup policy. For example, in some embodiments the schedule may specify that when this backup policy is active, the backup operations should be initiated at a particular backup frequency, such as every 24 hours, every 12 hours, every 4 hours, etc. The schedule may also be specified using particular times and days, such as every Monday at 2:00 am, every Wednesday at 12:00 am, etc. The user may also define different schedules for different types of backup operations. For example, full backup operations may be scheduled once a week on Sundays, while incremental backup operations may be scheduled for all other days. The user may define an appropriate schedule for the backup policy depending upon which level of backup protection the backup policy corresponds to.

As indicated in block 422, the backup server software 56 may also receive user input specifying which data to backup when this backup policy is active. For example, at the first level of backup protection the user may only want critical application data to be backed up since there are still other nodes available in the cluster with redundant copies of non-critical application data. As the level of backup protection increases due to node failures, the user may want additional non-critical application data to be backed up since the redundancy of the application data has decreased.

As indicated in block 423, the backup server software 56 may also receive user input specifying which backup storage device(s) to use for the backup operations when this backup policy is active. The user may want different backup storage devices to be used for different levels of backup protection. For example, at the first level of backup protection, the backup data may be stored on an inexpensive backup storage device that may not enable fast recovery if the backup data needs to be restored to the cluster. When the level of backup protection is escalated, the backup data may be sent to a different backup storage device with faster performance. This may enable the backup data to be restored faster in the event that a restore operation needs to be performed. As another example, when the level of backup protection is escalated, the backup data may be sent to a different storage device that is located closer to a data center where one or more of the cluster nodes are located, or at the same data center. Again, this may enable the backup data to be restored faster in the event that a restore operation needs to be performed, e.g., due to lower network latency.

As indicated in block 425, the backup server software 56 may also receive user input specifying a snapshot retention duration to use when this backup policy is active. In some embodiments a snapshot such as a copy-on-write snapshot may be used to perform each backup operation. Each snapshot may be retained for a particular retention period and then may be deleted. The user may want backup policies corresponding to higher levels of backup protection to specify longer snapshot retention periods.

As indicated in block 427, the backup server software 56 may store information specifying the backup policy after the user has provided the user input defining the backup policy. For example, the backup policy may be stored in one or more files or databases. When a backup policy is activated the backup server software 56 may retrieve the stored information and analyze it so that it can begin performing the backup operations for the cluster in accordance with the properties specified by the backup policy.

Figure 6:
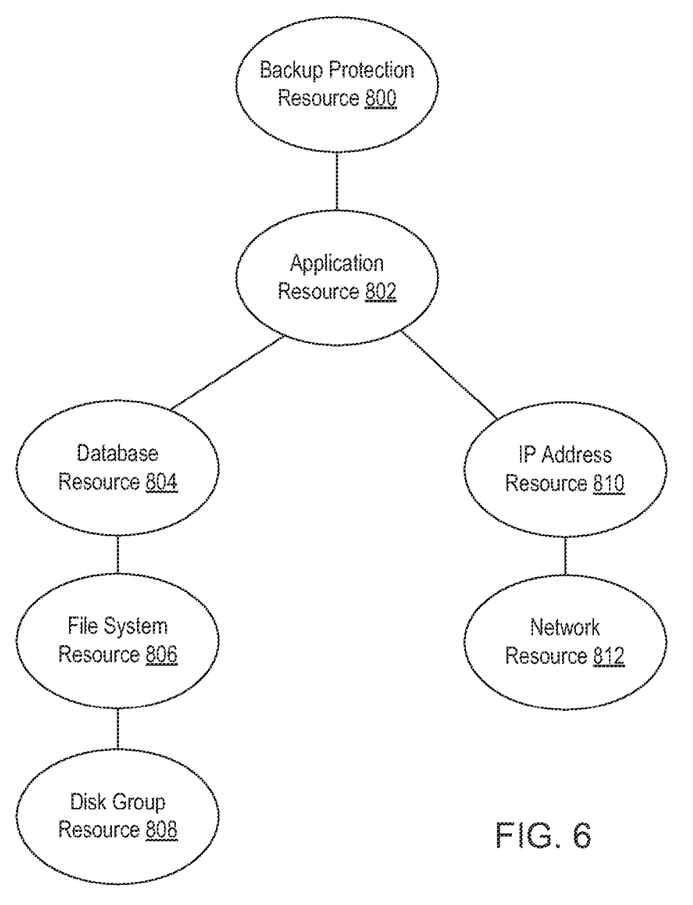
FIG. 6 illustrates one embodiment of a resource dependency tree for a resource group that includes a backup protection resource.

As mentioned above, in some embodiments the cluster may use clustering software that enables an administrator to define a resource group that includes a backup protection resource. FIG. 6 illustrates one embodiment of a resource dependency tree for such a resource group. The resource dependency tree represents dependencies among various resources used by the clustered application. Parent resources located higher in the tree depend on the children resources below them. For example, the database resource 804 depends on the file system resource 806, which in turn depends on the disk group resource 808.

For each resource in the resource dependency tree, a corresponding software agent may monitor the status of the resource and update the clustering software about the status of the resource. If any of the resources go offline, e.g., due to a failure of the resource, the corresponding agent may notify the clustering software, as well as notifying the agents for the parent resources in the dependency tree.

As shown in FIG. 6, the resource group may include a backup protection resource 800 at the root of the dependency tree. The agent corresponding to the backup protection resource 800 may listen for updates sent by other resource agents. Since the backup protection resource 800 is located at the root (top) of the dependency tree, any failure by any of the other resources in the tree may be reported to the agent for the backup protection resource 800. The agent may then forward the information describing the failure to the backup server software 56. The backup server software 56 may then respond to the failure if necessary, e.g., by escalating the level of backup protection for the application data.

In some embodiments an administrator of the system may configure the backup server software 56 to respond differently to different kinds of failures, e.g., depending on which particular resource or combination of resources failed. For example, a failure of one type of resource may cause the level of backup protection to be escalated from the first level to the second level, whereas the failure of another type of resource may cause the level of backup protection to be escalated by more than one level.

As noted above, in other embodiments the backup software 56 may be configured to detect failures in the cluster using other techniques, such as by subscribing to events generated by the clustering software, for example.

Figure 7:
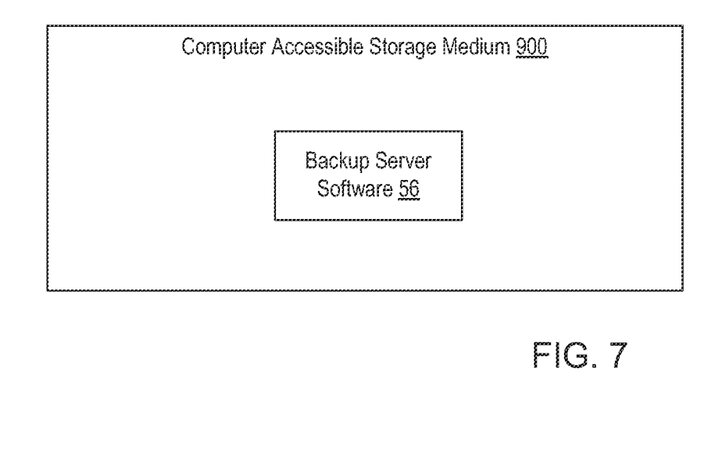
FIG. 7 is a block diagram of a computer accessible storage medium that stores program instructions.

Turning now to FIG. 7, a block diagram of a computer accessible storage medium 900 is shown. The computer accessible storage medium 900 may store program instructions executable by one or more processors to implement various functions described above, such as program instructions associated with the backup server software 56. Generally, the computer accessible storage medium 900 may store any set of instructions which, when executed, implement a portion or all of the functions described above for defining multiple levels of backup protection, and/or activating a different level of backup protection in response to a node failure.

A computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Although the above description discusses various functions that may be performed by the backup server software 56 executing on the backup server computer 102, it is noted that in alternative embodiments the functions may be performed by software executing on a computer other than the backup server computer 102. For example, the methods described herein may be performed by backup software or other software executing on the nodes 100.

Numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable by one or more processors to:
   configure a backup software application to backup application data used by a cluster of nodes according to a first level of backup protection;
   detect a failure of a node in the cluster; and
   in response to the failure, configure the backup software application to backup the application data used by the cluster of nodes according to an escalated level of backup protection.

2. The computer-accessible storage medium of claim 1, wherein in configuring the backup software application to backup the application data according to the escalated level of backup protection, the program instructions are executable by the one or more processors to cause the backup software application to increase a frequency at which backup operations for backing up the application data are performed.

3. The computer-accessible storage medium of claim 1,
wherein the program instructions are executable to configure the backup software application to backup the application data according to the first level of backup protection by configuring the backup software application with a first backup policy specifying a first time schedule for backing up the application data; and
wherein the program instructions are executable to configure the backup software application to backup the application data according to the escalated level of backup protection by configuring the backup software application with a second backup policy specifying a second time schedule for backing up the application data, wherein the second time schedule specifies an increased frequency for backing up the application data relative to the first time schedule.

4. The computer-accessible storage medium of claim 1,
wherein in configuring the backup software application to backup the application data according to the first level of backup protection, the program instructions are executable by the one or more processors to configure a first snapshot retention period for retaining snapshots used in backing up the application data;
wherein in configuring the backup software application to backup the application data according to the escalated level of backup protection, the program instructions are executable by the one or more processors to increase the snapshot retention period.

5. The computer-accessible storage medium of claim 1,
wherein in configuring the backup software application to backup the application data according to the first level of backup protection, the program instructions are executable by the one or more processors to configure the backup software application to backup the application data to a first storage device;
wherein in configuring the backup software application to backup the application data according to the escalated level of backup protection, the program instructions are executable by the one or more processors to configure the backup software application to backup the application data to a second storage device different than the first storage device.

6. The computer-accessible storage medium of claim 5, wherein the second storage device has faster performance than the first storage device.

7. The computer-accessible storage medium of claim 5, wherein the second storage device is physically located closer to the cluster of nodes than the first storage device.

8. The computer-accessible storage medium of claim 1, wherein the program instructions are further executable by the one or more processors to:
receive user input specifying a first backup policy that defines the first level of backup protection; and
receive user input specifying a second backup policy that defines the escalated level of backup protection.

9. The computer-accessible storage medium of claim 1,
wherein the node is a first node;
wherein the escalated level of backup protection is a first escalated level of backup protection;
wherein the program instructions are further executable by the one or more processors to:
detect a failure of a second node in the cluster after the failure of the first node;
in response to the failure of the second node, configure the backup software application to backup the application data used by the cluster of nodes according to a second escalated level of backup protection.

10. A system comprising:
one or more processors; and
memory storing program instructions;
wherein the program instructions are executable by the one or more processors to:
configure a backup software application to backup application data used by a cluster of nodes according to a first level of backup protection;
detect a failure of a node in the cluster; and
in response to the failure, configure the backup software application to backup the application data used by the cluster of nodes according to an escalated level of backup protection.

11. The system of claim 10,
wherein in configuring the backup software application to backup the application data according to the escalated level of backup protection, the program instructions are executable by the one or more processors to cause the backup software application to increase a frequency at which backup operations for backing up the application data are performed.

12. The system of claim 10,
wherein the program instructions are executable to configure the backup software application to backup the application data according to the first level of backup protection by configuring the backup software application with a first backup policy specifying a first time schedule for backing up the application data; and
wherein the program instructions are executable to configure the backup software application to backup the application data according to the escalated level of backup protection by configuring the backup software application with a second backup policy specifying a second time schedule for backing up the application data, wherein the second time schedule specifies an increased frequency for backing up the application data relative to the first time schedule.

13. The system of claim 10,
wherein in configuring the backup software application to backup the application data according to the first level of backup protection, the program instructions are executable by the one or more processors to configure a first snapshot retention period for retaining snapshots used in backing up the application data;
wherein in configuring the backup software application to backup the application data according to the escalated level of backup protection, the program instructions are executable by the one or more processors to increase the snapshot retention period.

14. The system of claim 10,
wherein in configuring the backup software application to backup the application data according to the first level of backup protection, the program instructions are executable by the one or more processors to configure the backup software application to backup the application data to a first storage device;
wherein in configuring the backup software application to backup the application data according to the escalated level of backup protection, the program instructions are executable by the one or more processors to configure the backup software application to backup the application data to a second storage device different than the first storage device.

15. The system of claim 10,
wherein the node is a first node;
wherein the escalated level of backup protection is a first escalated level of backup protection;
wherein the program instructions are further executable by the one or more processors to:
   detect a failure of a second node in the cluster after the failure of the first node;
   in response to the failure of the second node, configure the backup software application to backup the application data used by the cluster of nodes according to a second escalated level of backup protection.

16. A method comprising:
executing program instructions on a computer system, wherein executing the program instructions includes:
   configuring a backup software application to backup application data used by a cluster of nodes according to a first level of backup protection;
   detecting a failure of a node in the cluster; and
   in response to the failure, configuring the backup software application to backup the application data used by the cluster of nodes according to an escalated level of backup protection.

17. The method of claim 16,
wherein configuring the backup software application to backup the application data according to the escalated level of backup protection comprises causing the backup software application to increase a frequency at which backup operations for backing up the application data are performed.

18. The method of claim 16,
wherein configuring the backup software application to backup the application data according to the first level of backup protection comprises configuring a first snapshot retention period for retaining snapshots used in backing up the application data; and
wherein configuring the backup software application to backup the application data according to the escalated level of backup protection comprises increasing the snapshot retention period.

19. The method of claim 16, further comprising:
configuring a resource dependency tree including a backup protection resource having one or more child resources;
wherein detecting the failure of the node in the cluster comprises a software agent for the backup protection resource receiving a notification indicating a failure of a particular child resource from an agent corresponding to the particular child resource.

20. The method of claim 16,
wherein detecting the failure of the node in the cluster comprises receiving a programmatic event notification indicating the failure.

\* \* \* \* \*